(12) United States Patent
Vignon et al.

(10) Patent No.: US 8,252,921 B2
(45) Date of Patent: Aug. 28, 2012

(54) METHOD FOR THE CONTROLLED OXIDATION OF POLYSACCHARIDES

(75) Inventors: Michel Vignon, Meylan (FR); Suzelei Montanari, Grenoble (FR); Daniel Samain, Uriage (FR); Jean-Stéphane Condoret, Toulouse (FR)

(73) Assignees: Centre National de la Recherche Scientifique (CNRS), Paris Cedex (FR); Institute National Polytechnique de Toulouse, Toulouse Cedex (FR)

( * ) Notice: Subject to any disclaimer, the term of this patent is extended or adjusted under 35 U.S.C. 154(b) by 313 days.

(21) Appl. No.: 11/658,852

(22) PCT Filed: Jul. 29, 2005

(86) PCT No.: PCT/FR2005/002002
§ 371 (c)(1),
(2), (4) Date: Apr. 13, 2007

(87) PCT Pub. No.: WO2006/018552
PCT Pub. Date: Feb. 23, 2006

(65) Prior Publication Data
US 2008/0194805 A1 Aug. 14, 2008

(30) Foreign Application Priority Data
Jul. 29, 2004 (FR) .................................... 04 08402

(51) Int. Cl.
*C08B 15/04* (2006.01)
*C08B 31/18* (2006.01)
*C08B 37/00* (2006.01)

(52) U.S. Cl. ........ 536/56; 536/105; 536/123.1; 536/124

(58) Field of Classification Search ........................ None
See application file for complete search history.

(56) References Cited

U.S. PATENT DOCUMENTS

| 2,472,590 | A | | 6/1949 | Kenyon et al. |
| 4,990,601 | A | | 2/1991 | Skjak-Braek et al. |
| 5,541,316 | A | | 7/1996 | Engelskirchen et al. |
| 5,977,348 | A | * | 11/1999 | Harris et al. ............. 536/107 |

FOREIGN PATENT DOCUMENTS
EP 0 161 212 11/1985

OTHER PUBLICATIONS

Jenzer, G. and Mallat, T. and Baiker, A., Catalysis Letters "Continuous oxidation of benzyl alcohol in "supercritical" carbon dioxide", vol. 73, issue 1, pp. 5-8 (2001).*
Phase Diagrams of Pure Substances, available at http://www.chemguide.co.uk/physical/phaseeqia/phasediags.html; last viewed Dec. 2, 2009.*
International Search Report for PCT/FR2005/002002 mailed Dec. 21, 2005 (English and French).

* cited by examiner

*Primary Examiner* — Shaojia Anna Jiang
*Assistant Examiner* — Bahar Schmidtmann
(74) *Attorney, Agent, or Firm* — Nixon & Vanderhye P.C.

(57) ABSTRACT

The invention relates to a method for the controlled oxidation of oligo- and/or polysaccharides containing free —$CH_2OH$ primary hydroxyl groups, using an oxidizing agent. The invention is characterized in that the oxidation reaction is performed in a densified fluid which is inert in relation to the oxidizing agents employed. The invention is suitable for use, for example, in the food, paint, paper, textile, agricultural and pharmaceutical industries, in the medical, biomedical or paramedical fields, in the surgical field, in the cosmetic industry and as agents for the complexing or sequestering of metal ions, heavy metals and radioactive elements in the nuclear industry.

9 Claims, 3 Drawing Sheets

METHOD FOR THE CONTROLLED OXIDATION OF POLYSACCHARIDES

Figure 1A:
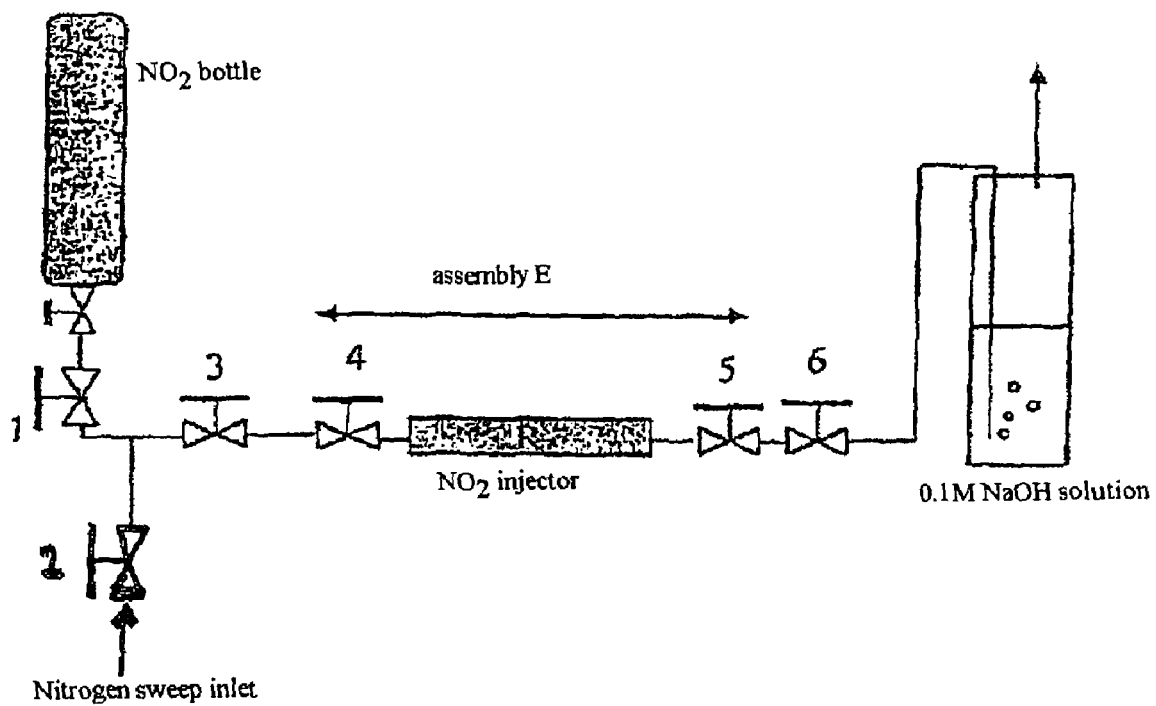

This application is the US national phase of international application PCT/FR2005/002002 filed 29 Jul. 2005, which designated the U.S. and claims priority to FR 0408402 filed 29 Jul. 2004, the entire content of each of which is hereby incorporated by reference.

The invention relates to a method for the controlled oxidation of oligo- and/or polysaccharides containing free —$CH_2OH$ primary hydroxyl groups, using an oxidizing agent, leading selectively to carboxylated oligo- and/or polysaccharides.

In the subsequent description and in the claims, the term "polysaccharides" will be used to denote without distinction oligosaccharides or polysaccharides, or mixtures thereof.

The oxidation of polysaccharides by nitrogen dioxide ($NO_2/N_2O_4$), as oxidizing agent, is a well-known reaction.

Yackel et al. have in particular described, in U.S. Pat. No. 531,283, the selective oxidation of cellulose by $NO_2$ gas under temperature conditions of less than or equal to 20° C. The use of $NO_2$ gas has, however, proved to be tricky, resulting in particular in oxidation hetero-geneities. Various methods of oxidation in an organic solvent medium have therefore been proposed by several authors.

Thus, Kenyon et al., in U.S. Pat. No. 2,423,707, or else Ashton et al., in U.S. Pat. No. 3,364,200, have described the oxidation of cellulose with nitrogen dioxide in nonaqueous solvents such as carbon tetrachloride, and freons 113 and 11. U.S. Pat. No. 5,180,398 by Boardman and Saferstein describes the oxidation of cellulose by nitrogen dioxide in perfluoro solvents, and Kosowski et al., in U.S. Pat. No. 5,914,003, have used another class of solvents, hydrofluoroethers, to replace the chlorofluoro carbons previously used.

The use of halogenated solvents represents, however, a risk to the environment. In addition, for the numerous applications, and in particular in the medical field, it is imperative to have products that are oxidized homogeneously.

These imperatives have led the inventors to search for new oxidation conditions that are more satisfactory for the environment and make it possible to have homogeneous carboxylated polysaccharides that are better at meeting the practical requirements.

Their studies have therefore made it possible to observe that it is possible to carry out the oxidation of polysaccharides in an alternative reaction medium, making it possible in particular to solubilize large amounts of the oxidizing agent while at the same time preserving its reactivity.

The aim of the invention is therefore to provide a new method for the oxidation of polysaccharides that makes it possible to obtain a variable mass % carboxylic acid content, ranging, in the case of cellulose, up to approximately 25.5% (which corresponds to 100% oxidation of the primary hydroxyl groups), controlled by the duration of the reaction and the amount of oxidizing agent, distributed homogenously, regardless of the degree of oxidation.

The invention is also aimed at the new polysaccharides obtained and at taking advantage of their properties in various industrial fields.

The method of the invention for the controlled oxidation of polysaccharides containing free —$CH_2OH$ groups, using an oxidizing agent, is characterized in that a densified fluid which is inert in relation to the oxidizing agents employed is used for the oxidation reaction.

This densified fluid is composed of molecules which are gaseous under normal temperature and pressure conditions, which are inert in relation to the oxidizing agents employed and which are compressed at over 2 MPa (20 bar).

The densified fluids are gases compressed at a pressure such that they no longer obey the equation of state of ideal gases. The thermodynamic behavior in these temperature and pressure ranges is complex and can reveal, for example, two phases, an expanded liquid and a densified gas.

In the case of the densified gas, the product of the pressure multiplied by the volume ceases to be a constant and decreases with increasing pressure, which leads to a correlative increase in density. This phenomenon can be interpreted in terms of the creation, based on a certain pressure, of interactions between molecules.

The behavior of densified fluids will then depend on the proximity of the critical point in relation to the temperature and pressure conditions used.

As appropriate, densified fluids are therefore either in the form of a densified gaseous phase or in the form of an expanded liquid phase.

They generally have properties which are intermediate between those of gases and of liquids. Unlike gases, they in particular have a certain solvent capacity in relation to molecules that are normally relatively nonvolatile, not only in their expanded liquid form, but also in their densified gaseous phase form. This solvent capacity is largely dependent on the density of the densified gas and on the affinity between the solvent molecules and the solute molecules.

Inert gases that can be used include the rare gases He, Ne, Kr or Ar, or alternatively $CO_2$ or $N_2$, or perhalogenated gases, and mixtures thereof, which provides the advantage of having a solvent for the oxidizing agent, either already in its maximum oxidation state, or neutral and inert in relation to the oxidizing agents employed.

The inert gas(es) is/are used alone or as a mixture with other cosolvents that are liquid under normal temperature and pressure conditions.

In a variant, the inert gas(es) is/are used with a liquid cosolvent, such as a perfluorinated solvent.

The inert gases are more particularly $CO_2$, dinitrogen, argon or mixtures thereof. In the specific case of the use of these gases, the final product will therefore be devoid of solvent-related contaminants, which is a great advantage with regard to the industrial applications targeted for the carboxylated polysaccharides formed, in particular for their biomedical applications.

It will also be noted with interest that their use is in keeping with safe methods that preserve the environment.

The oxidizing agent is preferably nitrogen dioxide, this term denoting $NO_2$, the $N_2O_4$ dimer, and mixtures thereof.

Inert gases such as $CO_2$, nitrogen or argon are normally known for their lack of interaction with other molecules. However, the inventors have found that, very surprisingly, their use in the form of densified fluids, either in densified gaseous form, or in expanded liquid form, makes it possible to solubilize large amounts of $NO_2$ reactant, or of oxidizing agent in general.

In the case of the use of $CO_2$ as inert densified fluid, a certain solvent capacity has been noted under conditions of densified gas and of expanded liquid.

However, the solubility of $NO_2$ in the expanded liquid phase is infinite, whereas it is limited by a threshold value in the densified gas phase.

Said solubility is variable according to the temperature and pressure conditions.

By way of indication, it is of the order of 15 mg/ml at 40° C. and 8 MPa (80 bar). Above this value, a phenomenon of condensation occurs, with the appearance of the expanded liquid phase.

The $NO_2$ solubilized under these conditions clearly makes it possible to produce a reaction consisting of oxidation of the primary hydroxyls with the polysaccharides in a satisfactory manner.

This oxidation is effective and selective in the two phases. However, the amount of $NO_2$ that has to be involved in the densified gas phases in order to obtain a satisfactory degree of oxidation appears to be lower than in the case of the expanded liquids. These results reflect the fact that the $NO_2$ is more reactive in the densified gas phases than in the expanded liquid phases.

The oxidation reaction is carried out in a closed system, under pressure, preferably at a temperature of the order of from 20 to 60° C., in particular from 20 to 40° C., and under a pressure of the order of from 2 to 40 MPa (20 to 400 bar), in particular from approximately 6 to 18 MPa (60 to 180 bar).

In one embodiment with $CO_2$, the temperature is of the order of 31 to 50° C., in particular approximately 40° C., under a pressure of the order of 7.4 to 11 MPa (74 to 110 bar), in particular approximately 9 MPa (90 bar).

The polysaccharides are placed in the reactor, which is then filled with the inert densified fluid. These polysaccharides are generally in the form of "fibers", this term denoting, without distinction, fibrils, microfibrils, crystals, powders or lyophilisates, or other forms.

The oxidizing agent, in particular the nitrogen dioxide, is used, where appropriate, in the presence of oxygen. This oxidizing agent is used in excess in relation to the amount of $CH_2OH$ that it is desired to oxidize. The inert gas, which constitutes the solvent, is used in excess in relation to the $NO_2$, it being understood that the respective amounts of these compounds will be adjusted by those skilled in the art according to all the operating conditions selected for obtaining a polysaccharide having the desired carboxyl content.

At the end of the reaction, washing is carried out by dilution, by generating a leakage flow rate of the solvent(s)/oxidizing agent mixture in the reactor, while at the same time maintaining the pressure constantly above or at the same level as the working pressure, by appropriate means. The oxidizing agent thus remains in the dissolved state in the densified fluid and can then be gradually eliminated without there being a situation where there is a liquid state overconcentrated in relation to $NO_2$.

This dilution-washing arrangement also makes it possible to effectively remove the oxidizing agent and the other byproducts that might be within the treated polysaccharides.

After the step of washing by sweeping and elimination of the $NO_2$, the pressure is reduced under conditions that make it possible to remain in a single-phase system. The process is carried out in particular at a high temperature, of the order of 40° C.

In order to be sure that all the residual oxidizing agent has been eliminated, a sweep is advantageously carried out with an inert gas at low pressure.

The polysaccharides recovered at the end of the oxidation reaction are washed with a polar solvent or a mixture of polar solvents. Appropriate solvents are of the alcohol type, for example isopropanol/water, in order to eliminate the reaction byproducts, such as $HNO_3$.

The mass % carboxylic acid content can range up to 25.5% in the case of cellulose.

The polysaccharides subjected to the oxidation reaction are semicrystalline or microfibrillar products, such as cellulose, chitin, starch, amylose, nigeran (($\alpha(1\rightarrow3)$ $\alpha(1\rightarrow4)$ glucan)), $\beta(1\rightarrow3)$ glucan, $\beta(1\rightarrow4)$ mannan, $\beta(1\rightarrow3)$ xylan, inulin, agarose, carrageenans or glucomannan.

It is recalled that native cellulose consists of D-glucopyranose units linked to one another by $\beta(1\rightarrow4)$ linkages and exists in several crystalline forms (cellulose I form in the natural state; cellulose II, after treatment in an alkaline medium or derivatization, followed by regeneration/coagulation; cellulose III, after treatment of natural cellulose in a liquid $NH_3$ medium, or in the presence of amines).

The term "cellulose", as used in the description and the claims, denotes without distinction the various types of cellulose.

Cellulose II can in particular be in the form of threads, sponges or films.

In particular; cellulose II has the advantage of being shaped in an extrusion die so as to give filaments of various sizes. All types of regenerated cellulose can be used, whether they are obtained according to the viscose process or a solvent process, provided that they are not treated with $TiO_4$, or heavy metals.

It will also be possible, depending on the operating conditions, to oxidize fabrics based on these filaments while at the same time conserving the structure of these fabrics, in order to obtain absorbent dressings, and/or applications of the hemostatic dressing type, or bioresorbable surgical threads.

Chitin consists of N-acetyl-D-glucosamine units linked to one another by $\beta(1\rightarrow4)$ linkages.

$\beta(1\rightarrow3)$ glucan consists of D-glucopyranose units linked to one another by $\beta(1\rightarrow3)$ linkages.

$\beta(1\rightarrow4)$ mannan consists of D-mannopyranose units linked to one another by $\beta(1\rightarrow4)$ linkages.

Nigeran consists of D-glucopyranose units linked to one another by alternating a $(1\rightarrow3)$ and $\alpha(1\rightarrow4)$ linkages.

Starch consists of D-glucopyranose units linked to one another by $\alpha(1\rightarrow4)$ linkages and which carry, in places, branches consisting of D-glucopyranose units linked to one another by $\alpha(1\rightarrow6)$ linkages.

Amylose consists of D-glucopyranose units linked to one another via $\alpha(1\rightarrow4)$ linkages.

Inulin consists of $\beta(1\rightarrow2)$-D-fructofuranose units.

Agarose consists of a $\beta(1\rightarrow4)$-D-galactopyranose unit that alternates with an $\alpha(1\rightarrow3)$ 3,6-anhydro-L-galacto-pyranose unit.

Carrageenans consist of a $\beta(1\rightarrow4)$-D-galactopyranose unit that alternates with an $\alpha(1\rightarrow3)$ 3,6-anhydro-D-galacto-pyranose unit, and carry from 1 to 3 sulfate groups (respectively κ, ι and λ carrageenan).

The carboxylated polymers obtained have a broad spectrum of properties which mean that they are of great interest in many applications where they can be used alone or in the form of assemblies with two or more polysaccharides.

They are of great importance, in particular:

in the food industry, as thickeners, stabilizers of dispersions, of emulsions and of suspensions, as surfactants for low-calorie food products, or low-fat or low-cholesterol food products;

in the paint, paper or textile industry, as steric stabilizers for fillers;

in agriculture, in pesticide applications;

in the pharmaceutical industry, as excipients for medicaments, agents for controlling the release of active ingredients or of biomolecules, carriers for ointments or for creams, intestinal transit agents, toothpastes, flavor carriers;

in the medical, biomedical or paramedical field (separation and purification of proteins or of viruses by precipitation/affinity adsorption); in surgery, these polysaccharides are particularly useful, for example, as bioresorbable threads and/or fabrics for tissue or organ repair in humans or animals. They allow, in particular, support and the prevention of adhesions between two organs during a surgical procedure. They are also advantageous as dressings, fabrics and sponges, which have hemostatic and/or bacteriostatic properties;

in the cosmetics industry, as viscosity modifiers and gelling agents, in particular as gels; or as carriers for ointments and for creams, or other cosmetic formulations, as stabilizing agents for fillers;

as agents for the complexing or sequestering of metal ions, such as calcium ions that can be used in particular for detergents, cosmetics, or surface treatment;

of heavy metals and radioactive elements in the nuclear industry.

Figure 1B:
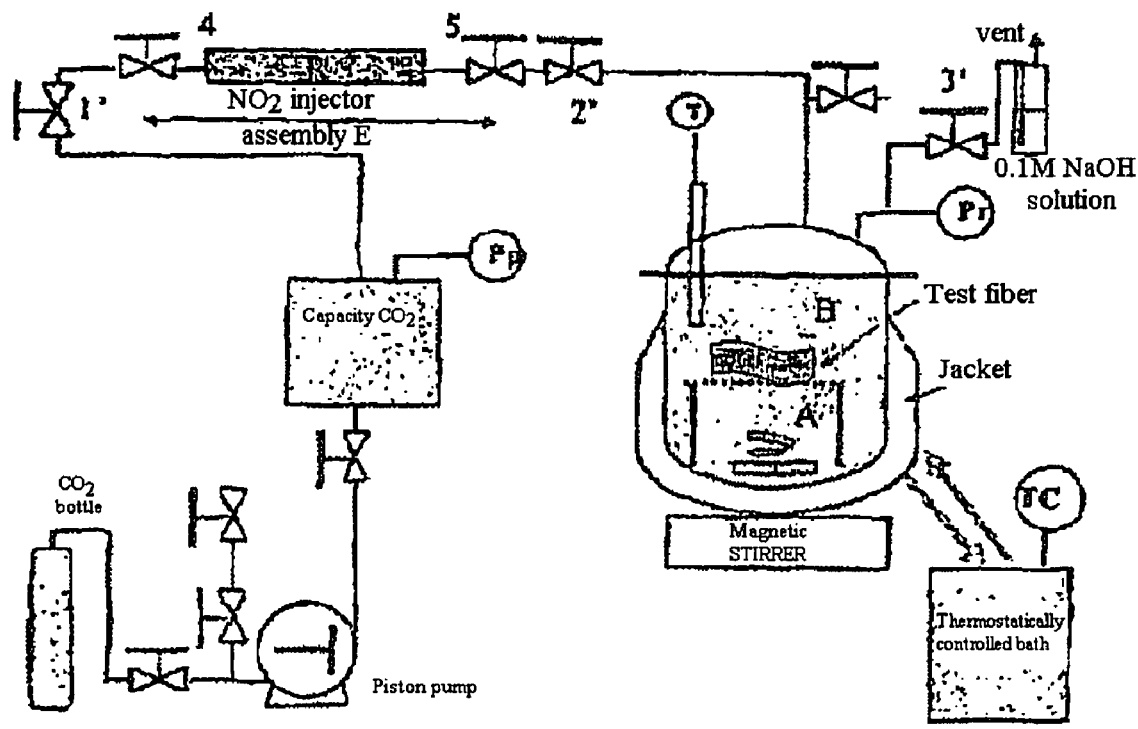
Figure 2A:
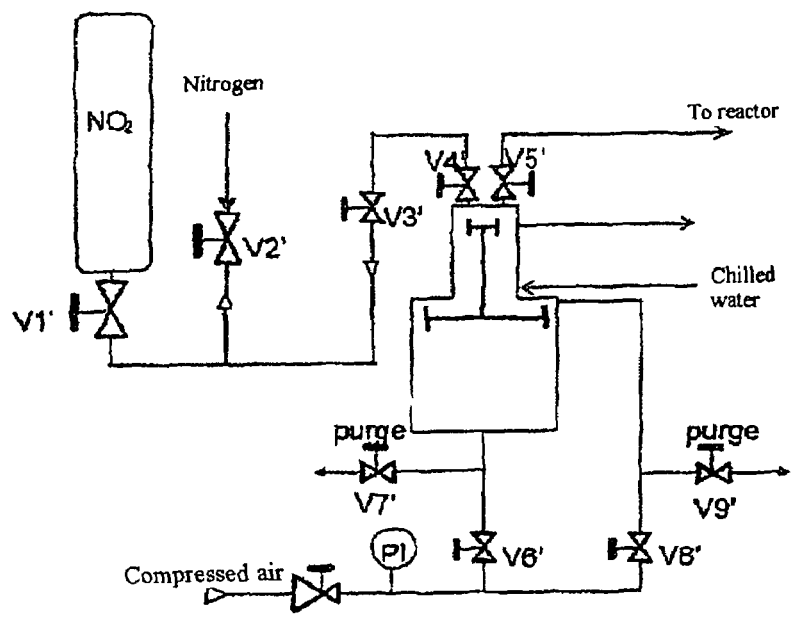
Figure 2B:
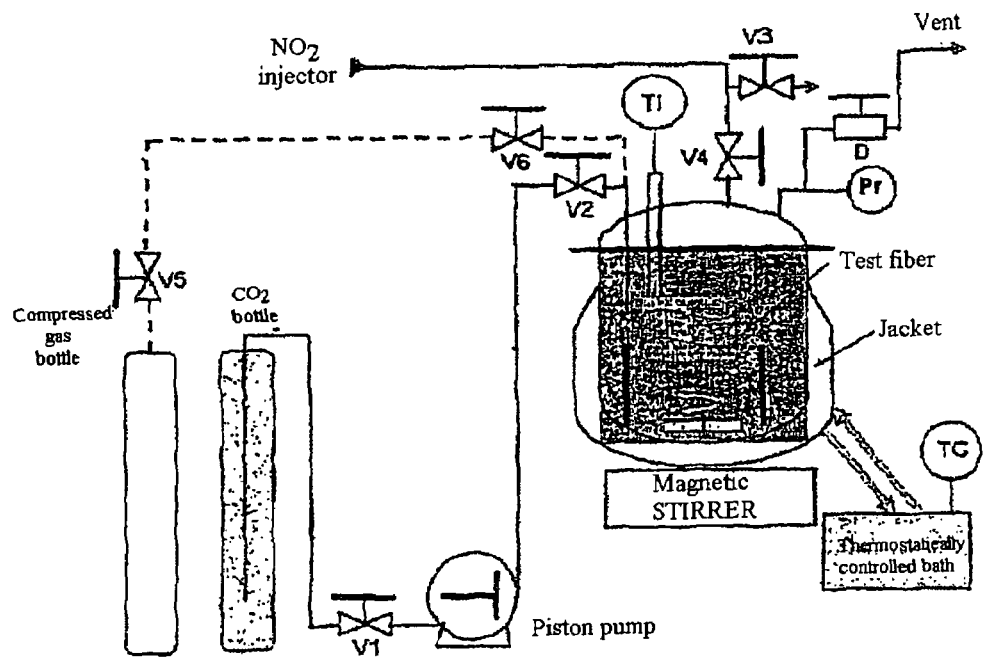

Other characteristics and advantages of the invention will emerge in the examples that follow and that refer to FIGS. 1A and 1B, and to FIGS. 2A and 2B, which represent the description of pieces of equipment used for the oxidation of polysaccharides.

Description of the Equipment for Experiments 1 to 5:
Procedure: Protocol 1
Introduction of $NO_2$ Via the Reservoir The $NO_2$ is first preloaded into a 20 ml transfer reservoir R maintained at 10° C. and inserted into a device F comprising several valves according to FIG. 1A. The bottle (Air Liquide, ref. DR 030259) containing the $NO_2$ is equilibrated at a temperature of 10° C., and then connected to the valve 1 of the device F. The latter was thoroughly dried beforehand with a stream of nitrogen and subsequently maintained under a nitrogen pressure of 0.2 MPa (2 bar). This pressure is released at the precise moment when the connection with the $NO_2$ bottle is made. These precautions are taken in order to prevent contact between the $NO_2$ and the water initially present, in gas or liquid phase, in the tubing of the device F, which would result in the possible formation of nitric acid. The valve 6 is connected, by means of a flexible Teflon® tube, to a flask of 2% w/w sodium hydroxide intended to neutralize the excess $NO_2$. The assembly is carried out in such a way that the bottle is above the reservoir R and the $NO_2$ can flow by gravity. The valve on the bottle is then opened, followed by the valves 1, 3, 4, 5 and 6. A release of gas into the flask containing the sodium hydroxide is then observed. The opening of the valve 6 is controlled so as to maintain the release of gas at a level such that the $NO_2$ is effectively destroyed as it passes into the flask. The device is thus purged with $NO_2$ gas for one minute. After this period of time, the valves 5 and 6 are closed and the system is allowed to equilibrate and the $NO_2$ is allowed to flow from the bottle to the reservoir and to completely condense in the latter. After 15 minutes, the valves 3 and 4 are closed and the reservoir is disconnected while maintaining the assembly E formed by the latter and by the valves 4 and 5. The assembly E was tared beforehand and the amount of $NO_2$ present inside the reservoir is then determined by weighing.

The following protocol is followed in order to introduce the $NO_2$ into the reactor (FIG. 1B).

The valves 1' and 2' being connected to one another and open, $CO_2$ in the supercritical state (40° C. and 8 MPa (80 bar)) is first loaded into the reactor. The assembly E is then inserted onto the reactor $CO_2$-feed circuit according to scheme 2 between the valves 1' and 2', the latter two being closed. The valve 2' is opened, followed by the valve 5, and the pressure then equilibrates between the reservoir R and the reactor. A resulting pressure of 7.5 MPa (75 bar) is measured by the manometer Pr. On the other side, the pump is activated until a set pressure of 9 MPa (90 bar), measured by the manometer Pp, is reached. The valves 1' and 4 are then opened such that the $CO_2$ can flow from the pump to the reactor and transfer all the $NO_2$ into the latter. When the pressure reaches 9 MPa (90 bar) inside the reactor, it is considered that all the $NO_2$ has been transferred and the valve 2' is closed. The reactor is equipped with two sapphire windows that make it possible, moreover, to verify that the reaction medium indeed has the characteristic red color of $NO_2$.

Description of the Reactor

The 316L stainless steel reactor, with a volume of 250 ml, was provided by Parr Industrie ($P_{max}$=30 MPa (300 bar), $t_{max}$=150° C.). It is thermostatically controlled, equipped with 2 sapphire windows and equipped with a magnetic stirrer. A perforated Teflon® plate is placed inside, and this makes it possible to define 2 compartments in the reactor. The lower part A allows the magnetic bar to rotate. The sample is placed in the upper part B. The pump for pressurizing the $CO_2$ is a Top Industrie pneumatic piston pump (ref. 0902 10000, $P_{max}$=60 MPa (600 bar)).

Procedure: Protocol 2
Description of the Reactor

The same 316L stainless steel reactor, with a volume of 250 ml, as in protocol 1 is used.

Procedure

The samples having been loaded into the reactor (FIG. 2B), the inlet valves for the $CO_2$ or the gas under pressure, V1 and V2, are opened, as is the back-pressure regulator D placed at the outlet (TESCOM ref.: 26-1700 with tracer cartridge), so as to sweep the air contained in the reactor by virtue of an inert gas flow rate. The back-pressure regulator is then closed in order to load the reactor with dense fluid at the working temperature and pressure. If the dense fluid is $CO_2$, the piston pump (TOP INDUSTRIE ref. 0902 10000, $P_{max}$=60 MPa (600 bar)) is used to reach the working pressure. If the dense fluid is a compressed gas (nitrogen or argon), the reactor is filled sequentially using the tubing between the valves V5 and V6 as a buffer reserve, preventing direct contact between the bottle and the reactor. The pressure in the reactor is controlled by virtue of a pressure sensor (Pr). The desired amount of $NO_2$ is then introduced into the reactor, by virtue of the injection device described below, V4 being open.

$NO_2$ Injection Protocol

The $NO_2$ is introduced into the reactor by virtue of a module for injection under pressure (TOP INDUSTRIE ref. 1644 1000) presented in FIG. 2A. This injection module is a pressure multiplier, the injection pressure being regulated by virtue of a counter-pressure of compressed air equal to one eighth of the injection pressure, this ratio corresponding to the ratio of the cross sections of the cylinders containing, firstly, the $NO_2$ and, secondly, the compressed air. The $NO_2$ bottle (Air Liquide, ref. DR030259) is connected to the injector by the valves V1', V3', and V4'. The injector compartment containing the $NO_2$ is maintained at approximately 13° C. such that the $NO_2$ is in the liquid state before injection into the reactor. The total volume of the $NO_2$ compartment is equal to 50 ml, and the real volume injected is known by virtue of the reading of the displacement of the injector piston. The injector is filled by opening the valves V1', V3' and V4' (bottle-injector connection) and the amount of $NO_2$ taken is controlled by virtue of the secondary compressed air circuit (V7' and V8' open, V6' and V9' closed). The transfer of the desired amount of $NO_2$ to the oxidation reactor under pressure is carried out while V1', V3' and V4' are closed and V5' open, and controlled by opening V6' and V9', V7' and V8' being closed. A nitrogen-inerting circuit that allows predrying and purging of the tubing and of the injector is provided on the injection device assembly.

Washing Protocol

At the end of the reaction, the oxidized samples are washed by dilution with supercritical $CO_2$. The valves V1 and V4 are then open and the back-pressure regulator D is regulated at the desired pressure for washing (generally 9-10 MPa (90-100 bar)). The back-pressure regulator is an upstream pressure regulator which therefore makes it possible to ensure a constant pressure in the reactor. The back-pressure regulator is heated so as to avoid the formation of dry ice which could take place when the pressure of the reactor pressure outlet flow is reduced to atmospheric pressure. This washing makes it possible to eliminate most of the compounds present in the reactor. The reactor is then depressurized slowly so as to maintain a constant temperature.

Examples 1 to 5 Carried Out According to the Procedure of Protocol 1:

EXAMPLE 1

2.90 g of TENCELL® fibers were placed in compartment B of the reactor (FIG. 1B), which is then filled with supercritical carbon dioxide (40° C. and 8 MPa (80 bar)). 33 g of nitrogen dioxide are then introduced into the reactor according to protocol 1. The reaction is carried out with stirring at 40° C. and 9 MPa (90 bar) for 4 hours. The reaction conditions and the $CO_2/NO_2$ ratio used define an expanded liquid phase. The temperature and the pressure are maintained and washing is carried out with $CO_2$ under supercritical conditions. The depressurization is sufficiently slow for the temperature to remain constant. After the reactor has been opened, the treated fibers are removed and washed 0.3 times with a water:isopropanol (1:1) mixture and twice with pure isopropanol in order to remove the water. The sample is dried in an incubator at 60° C. for 3 hours. 3.15 g of oxidized cellulose are recovered, the latter still having the appearance of white-colored fibers.

Determination of the degree of oxidation: 200 mg of cellulose were dissolved in 2 ml of 0.5M NaOH and diluted with 8 ml of water. The solution was titrated to neutrality with a standard solution of 0.05M HCl, using phenolphthalein as an indicator. A blank was realized without the addition of cellulose. The carboxylic acid content thus measured is 14%.

EXAMPLE 2

3.29 g of TENCELL® fibers and 2.2 g of Rayonne® fibers were placed separately in compartment B of the reactor (FIG. 1B), which is then filled with supercritical carbon dioxide (40° C. and 8 MPa (80 bar)). 33 g of nitrogen dioxide are then introduced into the reactor according to protocol 1. The reaction is carried out with stirring at 40° C. and 9 MPa (90 bar) for 5 hours. The reaction conditions and the $CO_2/NO_2$ ratio used define an expanded liquid phase. At the end of the reaction, "dilution washing" of the reactor is carried out by generating a leakage flow rate in the reactor while at the same time maintaining the pressure, by virtue of the pump which provides pure $CO_2$ under pressure. After depressurization, the treated fibers are removed from the reactor and washed 3 times with a water:isopropanol (1:1) mixture and then with pure isopropanol in order to remove the water. A white-colored homogeneous fibrous material with a carboxylic acid content of 16% for the TENCELL® fibers and of 17% for the Rayonne® fibers is then recovered.

EXAMPLE 3

3.1 g of TENCELL® fibers, 2.7 g of Rayonne® fibers and a 1.5 g piece of a Spontex® sponge were placed separately in compartment B of the reactor (FIG. 1B), which is then filled with supercritical carbon dioxide (40° C. and 8 MPa (80 bar)). 33 g of nitrogen dioxide are then introduced into the reactor according to protocol 1. The reaction is carried out with stirring at 40° C. and 9 MPa (90 bar) for 7 hours. The reaction conditions and the $CO_2/NO_2$ ratio used define an expanded liquid phase. At the end of the reaction, "dilution washing" of the reactor is carried out by generating a leakage flow rate in the reactor while at the same time maintaining the pressure, by virtue of the pump which provides pure $CO_2$ under pressure. After depressurization, the white-colored treated fibers are removed from the reactor and washed 3 times with a water:isopropanol (1:1) mixture and then with pure isopropanol in order to remove the water.

The carboxylic acid content is 17% for the TENCELL® fibers, 18.5% for the Rayonne® fibers and 17% for the sponge.

EXAMPLE 4

4.05 g of TENCELL® fibers, 2.9 g of Rayonne® fibers and a 1.3 g piece of a Spontex® sponge were placed in compartment B of the reactor (FIG. 1B), which is then filled with supercritical carbon dioxide (40° C. and 8 MPa (80 bar)). 33 g of nitrogen dioxide are then introduced into the reactor according to protocol 1. The reaction is carried out with stirring at 40° C. and 9 MPa (90 bar) for 2.2 hours. The reaction conditions and the $CO_2/NO_2$ ratio used define an expanded liquid phase. At the end of the reaction, "dilution washing" of the reactor is carried out by generating a leakage flow rate in the reactor while at the same time maintaining the pressure, by virtue of the pump which provides pure $CO_2$ under pressure. After depressurization, the treated fibers are removed from the reactor and washed 3 times with a water:isopropanol (1:1) mixture and then with pure isopropanol in order to remove the water. The carboxylic acid content is 11% for the TENCELL® fibers, 12% for the Rayonne® fibers and 11% for the sponge. The TENCELL® and Rayonne® fibers are white in color.

Similar results (controlled oxidation) were obtained with natural textile fibers (cotton, flax, etc.).

EXAMPLE 5

The oxidation of a Rayon fabric (different weave and mesh) is performed by carrying out the process under the same conditions as in example 4. The oxidized fabric obtained is sterilized by γ-radiation. Its carboxylic acid content is 12%.

EXAMPLE 6

1.4 g of Rayon fibers and 1.5 g of cotton linters were placed in compartment B of the reactor (FIG. 2B), which is then filled with carbon dioxide (42° C. and 10 MPa (100 bar)). 33 g of nitrogen dioxide are then introduced into the reactor according to protocol 2. The reaction is carried out with stirring at 42° C. and 10 MPa (100 bar) for 15 hours. The reaction conditions and the $CO_2/NO_2$ ratio used define an expanded liquid phase. At the end of the reaction, the sample is washed and treated under the same conditions as in example 2. The carboxylic acid content is 15.9% for the rayon fibers and 6.4% for the cotton linters.

EXAMPLE 7

2.9 g of Rayon fibers were placed in compartment B of the reactor (FIG. 2B), which is then filled with carbon dioxide (40° C. and 7.5 MPa (75 bar)). 2.5 g of nitrogen dioxide are then introduced into the reactor according to protocol 2. The reaction is carried out with stirring at 40° C. and 7.5 MPa (75 bar) for 4 hours. The reaction conditions and the $CO_2/NO_2$ ratio used define a densified gas phase. At the end of the reaction, the sample is washed and treated under the same conditions as in example 2. A homogeneous fibrous material with a carboxylic acid content of 10% is then recovered.

EXAMPLE 8

1 g of Rayon fibers were placed in compartment B of the reactor (FIG. 2B), which is then filled with carbon dioxide (40° C. and 7.5 MPa (75 bar)). 2.5 g of nitrogen dioxide are then introduced into the reactor according to protocol 2. The reaction is carried out with stirring at 40° C. and 7.5 MPa (75 bar) for 15 hours. The reaction conditions and the $CO_2/NO_2$ ratio used define a densified gas phase. At the end of the reaction, the sample is washed and treated under the same conditions as in example 2. A homogeneous fibrous material with a carboxylic acid content of 15.9% is thus recovered.

EXAMPLE 9

3 g of Rayon fibers were placed in compartment B of the reactor (FIG. 2B), which is then filled with carbon dioxide (34° C. and 9.5 MPa (95 bar)). 33 g of nitrogen dioxide are then introduced into the reactor according to protocol 2. The reaction is carried out with stirring at 34° C. and 9.5 MPa (95 bar) for 4 hours. The reaction conditions and the $CO_2/NO_2$ ratio used define an expanded liquid phase. At the end of the reaction, the sample is washed and treated under the same conditions as in example 2. A homogeneous fibrous material with a carboxylic acid content of 10% is then recovered.

EXAMPLE 10

3.4 g of Rayon fibers were placed in compartment B of the reactor (FIG. 2B), which is then filled with carbon dioxide (23° C. and 8.5 MPa (85 bar)). 68 g of nitrogen dioxide are then introduced into the reactor according to protocol 2. The reaction is carried out with stirring at 23° C. and 8.5 MPa (85 bar) for 4 hours. The reaction conditions and the $CO_2/NO_2$ ratio used define an expanded liquid phase. At the end of the reaction, the sample is washed and treated under the same conditions as in example 2. A homogeneous fibrous material with a carboxylic acid content of 3.2% is then recovered.

EXAMPLE 11

2.9 g of Rayon fibers were placed in compartment B of the reactor (FIG. 2B), which is then filled with supercritical carbon dioxide (60° C. and 100 bar). 33 g of nitrogen dioxide are then introduced into the reactor according to protocol 2. The reaction is carried out with stirring at 60° C. and 10 MPa (100 bar) for 4 hours. The reaction conditions and the $CO_2/NO_2$ ratio used define an expanded liquid phase. At the end of the reaction, the sample is washed and treated under the same conditions as in example 2. A material with a carboxylic acid content of 18.6% is then recovered.

EXAMPLE 12

3 g of Rayon fibers were placed in compartment B of the reactor (FIG. 2B), which is then filled with carbon dioxide (42° C. and 18 MPa (180 bar)). 33 g of nitrogen dioxide are then introduced into the reactor according to protocol 2. The reaction is carried out with stirring at 42° C. and 18 MPa (180 bar) for 4 hours. The reaction conditions and the $CO_2/NO_2$ ratio used define an expanded liquid phase. At the end of the reaction, the sample is washed and treated under the same conditions as in example 2. A homogeneous fibrous material with a carboxylic acid content of 11% is then recovered.

EXAMPLE 13

3.2 g of Rayon fibers were placed in compartment B of the reactor (FIG. 2B), which is then filled with supercritical carbon dioxide (41° C. and 9.5 MPa (95 bar)). 52 g of nitrogen dioxide are then introduced into the reactor according to protocol 2. The reaction is carried out with stirring at 41° C. and 9.5 MPa (95 bar) for 4 hours. The reaction conditions and the $CO_2/NO_2$ ratio used define an expanded liquid phase. At the end of the reaction, the sample is washed and treated under the same conditions as in example 2. A homogeneous fibrous material with a carboxylic acid content of 14.4% is then recovered.

EXAMPLE 14

1.65 g of Rayon fibers and 0.91 g of cotton linters were placed in compartment B of the reactor (FIG. 2B), which is then filled with subcritical carbon dioxide (40° C. and 5.7 MPa). 2.5 g of nitrogen dioxide are then introduced into the reactor according to protocol 2. The reaction is carried out with stirring at 40° C. and 5.7 MPa for 4 hours. The reaction conditions and the $CO_2/NO_2$ ratio used define a densified gas phase. At the end of the reaction, the sample is washed and treated under the same conditions as in example 2. A homogeneous fibrous material with a carboxylic acid content of 11% for the Rayon and of 4% for the cotton linters is then recovered.

EXAMPLE 15

1.56 g of Rayon fibers and 1.02 g of cotton linters were placed in compartment B of the reactor (FIG. 2B), which is then filled with compressed nitrogen (40° C. and 8 MPa). 2.5 g of nitrogen dioxide are then introduced into the reactor according to protocol 2. The reaction is carried out with stirring at 40° C. and 8 MPa for 4 hours. The reaction conditions and the $CO_2/NO_2$ ratio used define a densified gas phase.

At the end of the reaction, dilution washing is carried out by introducing nitrogen under pressure while at the same time maintaining a leakage flow rate. Washing is then carried out with the isopropanol:water mixture under the same conditions as in example 2. A homogeneous fibrous material with a carboxylic acid content of 14% for the rayon and of 6% for the cotton linters is then recovered.

EXAMPLE 16

1 g of Rayon fibers was placed in compartment B of the reactor (FIG. 2B), which is then filled with compressed argon (40° C. and 7.5 MPa). 2.5 g of nitrogen dioxide are then introduced into the reactor according to protocol 2. The reaction is carried out with stirring at 40° C. and 7.5 MPa for 4 hours. The reaction conditions and the $CO_2/NO_2$ ratio used define a densified gas phase. At the end of the reaction, "dilution washing" of the reactor is carried out by generating a leakage flow rate in the reactor while at the same time maintaining the pressure, by virtue of the pump which provides the pure argon under pressure. Washing is then carried out with the isopropanol/water mixture under the same conditions as in example 2. A homogeneous fibrous material with a carboxylic acid content of 14.4% is then recovered.

EXAMPLE 17

3.01 g of glucomannan (ref. M1HCO, Kalis, France) were placed in a beaker containing a magnetic bar and sealed by means of a Teflon membrane. This beaker is placed in compartment B of the reactor (FIG. 2B), which is then filled with supercritical carbon dioxide (40° C. and 7.5 MPa). 5 g of nitrogen dioxide are then introduced into the reactor according to protocol 2. The reaction is carried out with stirring at 40° C. and 7.5 MPa for 4 hours. The reaction conditions and the $CO_2/NO_2$ ratio used define an expanded liquid phase. At the end of the reaction, the sample is washed and treated under the same conditions as in example 2. A homogeneous powdery material with a carboxylic acid content of 7.8% is then recovered.

EXAMPLE 18

3.15 g of potato starch; (Roquette, France) were placed in a beaker containing a magnetic bar and sealed by means of a Teflon membrane. This beaker is placed in compartment B of the reactor (FIG. 2B), which is then filled with supercritical carbon dioxide (40° C. and 7.5 MPa). 5 g of nitrogen dioxide are then introduced into the reactor according to protocol 2. The reaction is carried out with stirring at 40° C. and 7.5 MPa for 4 hours. The reaction conditions and the $CO_2/NO_2$ ratio used define an expanded liquid phase. At the end of the reaction, the sample is washed and treated under the same conditions as in example 2. A homogeneous powdery material with a carboxylic acid content of 8.1% is then recovered.

What is claimed is:

1. A method for the controlled oxidation of oligo- and/or polysaccharides containing free —$CH_2OH$ primary hydroxyl groups, using an oxidizing agent, characterized in that the oxidation reaction is carried out in a closed system filled with a densified fluid wherein the oligo- and/or polysaccharides are placed, the densified fluid being non reactive with said oxidizing agent and being an inert gas,
   said method being carried out at a temperature of the order of from 20 to 60° C., and under a pressure of the order of from 20 to 400 bar,
   the densified fluid being $CO_2$, the oxidizing agent being $NO_2$, $N_2O_4$ dimer or mixtures thereof, and
   said oxidizing agent being solubilized in the densified fluid while the oligo- and/or polysaccharides remain in a non solubilized solid state.

2. The method as claimed in claim 1, characterized in that said fluid is in the form of a densified gas phase.

3. The method as claimed in claim 1, characterized in that said fluid is in the form of an expanded liquid phase.

4. The method as claimed in claim 3, characterized in that the inert gas(es) is/are used as a mixture with other liquid cosolvents.

5. The method as claimed in claim 1, characterized in that the oxidizing agent is used in excess in relation to the amount of $CH_2OH$ that it is desired to oxidize.

6. The method as claimed in claim 1, characterized by the use of cellulose, starch or glucomannan as polysaccharide.

7. The method of claim 1 wherein the temperature is of the order of from 20 to 40° C.

8. The method of claim 1 wherein the pressure is of the order of from 60 to 180 bar.

9. The method of claim 1, further comprising eliminating the oxidizing agent after oxidation of said oligo- and/or polysaccharides, by generating a leakage flow rate in the reactor while also maintaining a pressure at least equal to the working pressure in the reactor with introduction of additional densified fluid.

\* \* \* \* \*